US009216684B2

(12) United States Patent
Kamiya et al.

(10) Patent No.: US 9,216,684 B2
(45) Date of Patent: Dec. 22, 2015

(54) DISPLAY APPARATUS

(71) Applicant: DENSO CORPORATION, Kariya, Aichi-pref. (JP)

(72) Inventors: Akira Kamiya, Kuwana (JP); Kohji Ohyama, Nagakute (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 111 days.

(21) Appl. No.: 14/045,106

(22) Filed: Oct. 3, 2013

(65) Prior Publication Data

US 2014/0097968 A1  Apr. 10, 2014

(30) Foreign Application Priority Data

Oct. 5, 2012  (JP) .................................. 2012-223129

(51) Int. Cl.
G08G 1/09 (2006.01)
B60Q 1/00 (2006.01)
G08G 1/16 (2006.01)
G02B 27/01 (2006.01)

(52) U.S. Cl.
CPC .............. *B60Q 1/0023* (2013.01); *G02B 27/01* (2013.01); *G08G 1/166* (2013.01); *G02B 2027/014* (2013.01); *G02B 2027/0138* (2013.01); *G02B 2027/0141* (2013.01); *G02B 2027/0145* (2013.01)

(58) Field of Classification Search
CPC .............. G02B 2027/0138; G02B 2027/0145; G02B 27/01; G01C 21/365

USPC .......................... 340/905, 435; 349/11; 345/7
See application file for complete search history.

(56) References Cited

U.S. PATENT DOCUMENTS

| 7,167,779 | B2* | 1/2007 | Kashiwada et al. .......... 340/435 |
| 7,629,877 | B2* | 12/2009 | Lvovskiy et al. ................. 345/7 |
| 2007/0013495 | A1 | 1/2007 | Suzuki et al. |
| 2009/0189753 | A1 | 7/2009 | Enya et al. |
| 2011/0298693 | A1 | 12/2011 | Tasaki et al. |
| 2012/0099032 | A1 | 4/2012 | Ishikawa |

FOREIGN PATENT DOCUMENTS

| JP | 2002-019491 | 1/2002 |
| JP | 2003-291688 | 10/2003 |
| JP | 2005-346117 | 12/2005 |

(Continued)

OTHER PUBLICATIONS

Office Action dated Sep. 30, 2014 in corresponding Japanese Application No. 2012-223129.

*Primary Examiner* — John A Tweel, Jr.

(74) *Attorney, Agent, or Firm* — Harness, Dickey & Pierce, P.L.C.

(57) ABSTRACT

A display apparatus for a vehicle includes a virtual image display device, a detection device, and a picture control device. The virtual image display device emits predetermined light to permit a windshield or a combiner to reflect the predetermined light towards an eye of a driver. The emitted predetermined light is to display a picture. The virtual image display device displays the picture in a displayed area as a virtual image; the picture appears ahead of the vehicle. The detection device detects a target that is an obstacle or an intersection. The picture control device displays the picture to appear below the target in the displayed area, and then moves the picture to a position corresponding to the target apparently while decreasing at least a width of the picture.

9 Claims, 9 Drawing Sheets

(56) References Cited

FOREIGN PATENT DOCUMENTS

| JP | 2005-347945 | 12/2005 |
|----|-------------|---------|
| JP | 2006-350617 | 12/2006 |
| JP | 2007-272350 | 10/2007 |
| JP | 2009-196630 | 9/2009 |
| JP | 2010-160606 | 7/2010 |
| JP | 2011-253097 | 12/2011 |
| JP | 2012-093506 | 5/2012 |

\* cited by examiner

DISPLAY APPARATUS

CROSS REFERENCE TO RELATED APPLICATION

The present application is based on Japanese Patent Application No. 2012-223129 filed on Oct. 5, 2012, the disclosure of which is incorporated herein by reference.

TECHNICAL FIELD

The present disclosure relates to a display apparatus which informs a driver of an obstacle or an intersection, for example, using a head-up display (HUD).

BACKGROUND ART

Patent Literature 1: JP 2012-093506 A (US 2012/0099032 A1)
Patent Literature 2: JP 2009-196630 A (US 2009/0189753 A1)

There are conventionally known head-up displays (HUDs) which project light on a windshield or combiner in vehicles and display pictures such as an alarm to permit drivers to view them (refer to Patent Literature 1). One technology of the HUDs acquires information on an obstacle close to a host vehicle, and displays a picture to permit a gaze of a driver to view the obstacle on which the picture is superimposed (refer to Patent Literature 2).

SUMMARY

Such superimposed display of an obstacle and a displayed picture in an HUD involves the technical issues as follows.

(1) The displayed picture of the HUD appears as a virtual image about two meters ahead of the face of a driver; this does not sufficiently offer a sense of distance to the obstacle.

(2) A large displayed picture hides a long distance obstacle (obstacle which looks small to the eye of the driver). In contrast, a small displayed picture does not permit the driver to recognize the displayed picture certainly.

It is an object to provide a display apparatus to improve such technical issues.

To achieve the above object, according to a first aspect of the present disclosure, a display apparatus for a vehicle is provided to include a virtual image display device, a detection device, and a picture control device. The virtual image display device emits predetermined light to permit a windshield or a combiner to reflect the predetermined light towards an eye of a driver. The emitted predetermined light is to display a picture. The virtual image display device displays the picture in a displayed area as a virtual image; the picture appears ahead of the vehicle. The detection device detects a target that is an obstacle or an intersection. The picture control device displays the picture to appear below the target in the displayed area, and then moves the picture to a position corresponding to the target apparently while decreasing at least a width of the picture.

Such manner of a displayed picture by the display apparatus enables a driver to obtain a sense of distance to an obstacle or intersection.

Further, according to a second aspect of the present disclosure, a display apparatus for a vehicle is provided to include a virtual image display device, a detection device, and a picture control device. The virtual image display device emits predetermined light to permit a windshield or a combiner to reflect the predetermined light towards an eye of a driver. The emitted predetermined light is to display a picture. The virtual image display device displays the picture in a displayed area as a virtual image; the picture appears ahead of the vehicle. The detection device detects a target that is an obstacle or an intersection. The picture control device displays the picture to appear below the target in the displayed area, and then moves the picture to a position corresponding to the target along a locus of an object that is assumed to be thrown towards the target.

Such manner of a displayed picture by the display apparatus enables a driver to obtain a sense of distance to an obstacle or intersection.

Further, according to a third aspect of the present disclosure, a display apparatus for a vehicle is provided to include a virtual image display device, a detection device, a distance estimation device, a picture control device, and an interval setting device. The virtual image display device emits predetermined light to permit a windshield or a combiner to reflect the predetermined light towards an eye of a driver. The emitted predetermined light is to display a picture. The virtual image display device displays the picture in a displayed area as a virtual image; the picture appears ahead of the vehicle. The detection device detects a target that is an obstacle or an intersection. The distance estimation device estimates a distance to the target. The picture control device displays the picture to appear at a position corresponding to the target, the picture including a plurality of picture elements that separate from each other with separation intervals, and then decreases the separation intervals of the picture elements to permit the plurality of picture elements of the picture to be integrated into an integrated picture. The interval setting device sets an initial value of the separation interval of the picture elements depending on a distance to the target.

Such manner of a displayed picture by the display apparatus helps prevent the displayed picture from hiding an obstacle or intersection.

Further, according to a fourth aspect of the present disclosure, a display apparatus for a vehicle is provided to include a virtual image display device, a detection device, a distance estimation device, and a picture control device. The virtual image display device emits predetermined light to permit a windshield or a combiner to reflect the predetermined light towards an eye of a driver. The emitted predetermined light is to display a picture. The virtual image display device displays the picture in a displayed area as a virtual image; the picture appears ahead of the vehicle. The detection device detects a target that is an obstacle or an intersection. The distance estimation device estimates a distance to the target. The picture control device vibrates the picture with an amplitude according to the estimated distance to the target.

Such manner of a displayed picture by the display apparatus enables a driver to obtain a sense of distance to an obstacle or intersection.

BRIEF DESCRIPTION OF THE DRAWINGS

The above and other objects, features, and advantages of the present disclosure will become more apparent from the following detailed description made with reference to the accompanying drawings. In the drawings.

DETAILED DESCRIPTION

<First Embodiment>

1. Configuration of Display Apparatus 1

Figure 1:
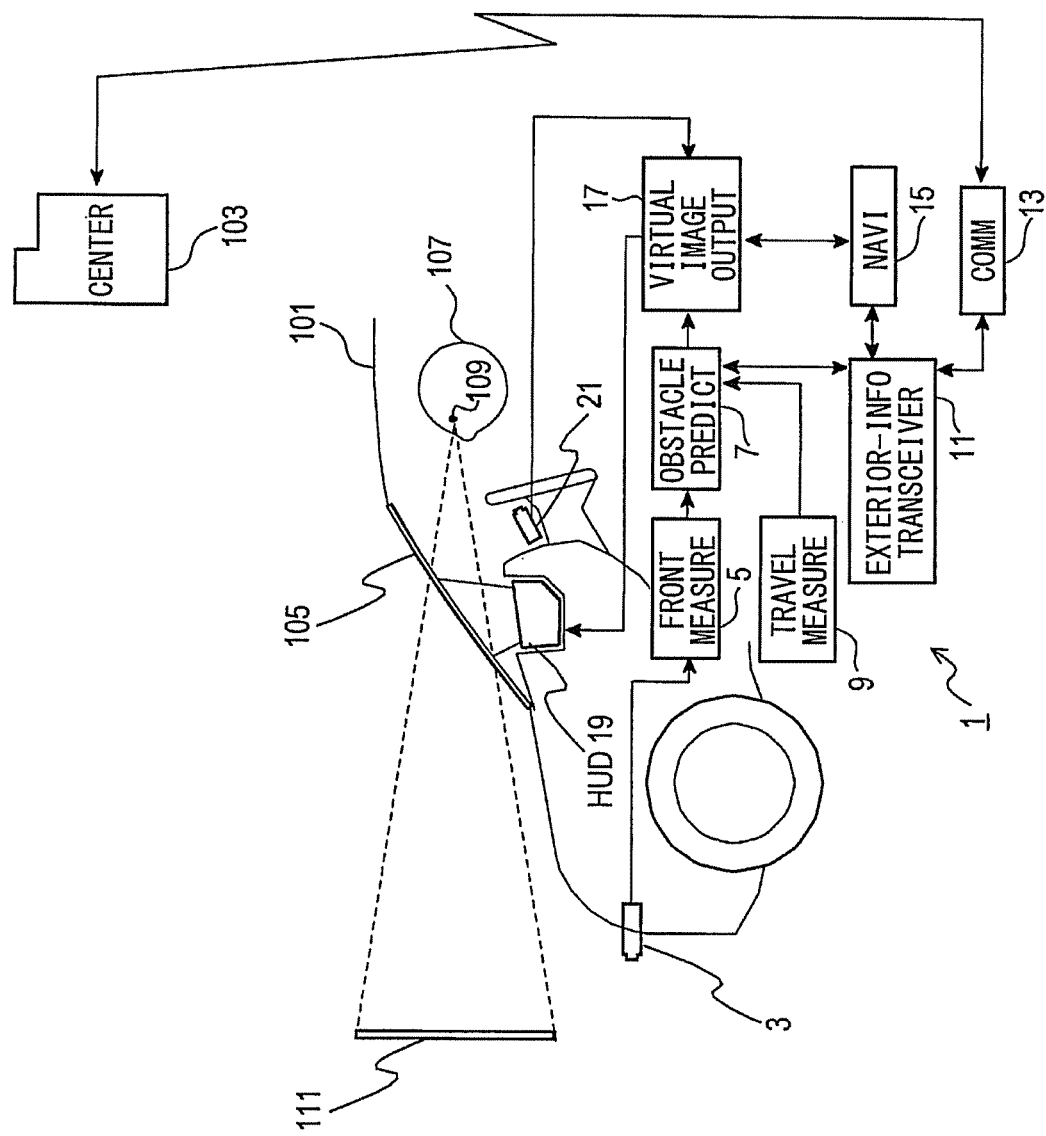
FIG. 1 is a block diagram illustrating a configuration of a display apparatus according to a first embodiment of the present disclosure.

A display apparatus according to a first embodiment of the present disclosure is mounted in a vehicle 101, which is also referred to as a host vehicle 101. With reference to FIG. 1, the display apparatus 1 includes a front camera 3 for photographing a forward area ahead of the vehicle 101; a front measuring circuit 5; an obstacle prediction circuit 7; a travel state measuring circuit 9; a vehicle-exterior information transceiver circuit 11; a wireless communicator 13; a navigation system 15; a virtual image output circuit 17; a HUD (Head-up Display) 19; and a driver camera 21 for photographing a driver or the face of the driver.

The above front measuring circuit 5, the obstacle prediction circuit 7, the travel state measuring circuit 9; the vehicle-exterior information transceiver circuit 11, and the virtual image output circuit 17 may be included in known computers. The front camera 3 is attached to a front end portion of the vehicle 101 to photograph (i.e., capture an image or picture of) a front area ahead of (in front of) the vehicle 101. The front measuring circuit 5 measures a position and a magnitude of an obstacle, which is located ahead of the vehicle 101, from several pictures or captured images obtained with the front camera 3. In addition, the front measuring circuit 5 recognizes a shape and a color (color of road surface) of a road ahead of the vehicle 101 (e.g., a road where the vehicle 101 is heading) from several pictures or captured images with the front camera 3.

The obstacle prediction circuit 7 predicts a future position (i.e., relative position) of an obstacle (i.e., distance from the vehicle 101 to the obstacle) up to several seconds later from a time-basis variation of the position of the obstacle, and a time-basis variation of the position of the vehicle 101 detected by the travel state measuring circuit 9; thereby, the circuit 7 determines affirmatively or negatively the possibility of an incident (contact of an obstacle to the vehicle 101).

The travel state measuring circuit 9 detects a position and speed of the vehicle 101. The vehicle-exterior information transceiver circuit 11 acquires information on presence and movement of an obstacle such as a different vehicle, a motorbike, a bicycle, or a pedestrian from a service center 103 outside of the vehicle 101 via the wireless communicator 13.

The navigation system 15 uses a well-known GPS, and acquires position information on the vehicle 101 and position information on a surrounding intersection.

In addition, when a destination of the vehicle 101 is inputted, the navigation system 15 designates a route to the destination and performs guidance of the route.

The virtual image output circuit 17 outputs a picture data to the HUD 19. The HUD 19 emits light, which is to display a picture, to a windshield 105 of the vehicle 101. Such light is reflected by the windshield 105 and enters a viewpoint 109 of a driver 107 of the vehicle 101. As a result, the driver 107 can see a virtual image 111 ahead of the vehicle 101; the virtual image 111 is based on the picture data outputted by the virtual image output circuit 17. The virtual image output circuit 17 changes the picture data such that the picture appears to be moving, the magnitude and shape of the picture appears to be changing, or the color and brightness of the picture appears to be changing, from a viewpoint of the driver 107.

It is noted that the HUD 19 is an example of a virtual image display device or means. The front camera 3, the front measuring circuit 5, the vehicle-exterior information transceiver circuit 11, and/or the wireless communicator 13 is an example of a detection device or means. The virtual image output circuit 17 is an example of a picture control device or means and/or an interval setting device or means. The front measuring circuit 5 is an example of a road recognition device or means. The travel state measuring circuit 9 is an example of a vehicle speed detection device or means. The front measuring circuit 5 is an example of a road surface color detection device or means. The obstacle prediction circuit 7 is an example of a distance estimation device or means.

2. Processes Performed by Display Apparatus 1

Figure 2:
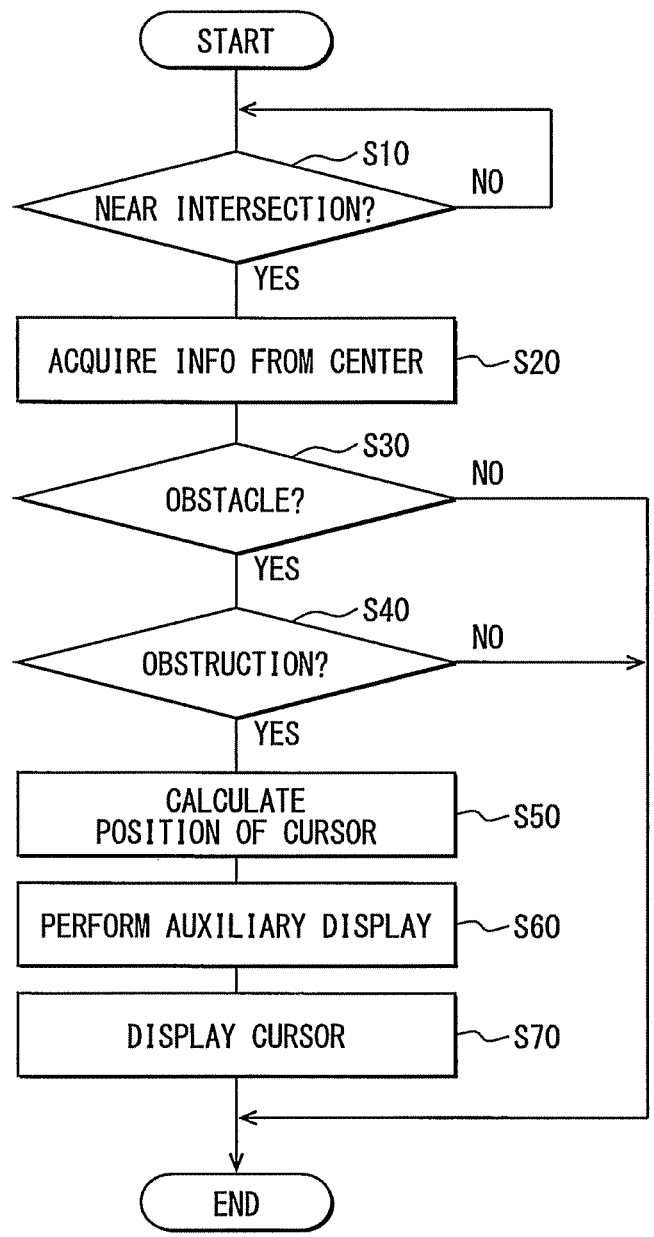
FIG. 2 is a flowchart diagram illustrating a first display process of an obstacle executed by the display apparatus.

(2-1) The following will explain a flowchart of a first display process of an obstacle (also referred to as a first obstacle display process) performed by the display apparatus 1 with reference to FIG. 2. The present process is repeatedly performed with a predetermined time interval during the travel of the vehicle 101.

It is further noted that a flowchart in the present application includes sections (also referred to as steps), which are represented, for instance, as S10. Further, each section can be divided into several sections while several sections can be combined into a single section. Furthermore, each of thus configured sections can be referred to as a module, device, or means and achieved not only (i) as a software section in combination with a hardware unit (e.g., computer), but also (ii) as a hardware section (e.g., integrated circuit, hard-wired logic circuit), including or not including a function of a related apparatus. Further, the hardware section may be inside of a microcomputer.

At S10, it is determined using the navigation system 15 whether the vehicle 101 is located near an intersection. When located near the intersection, the processing proceeds to S20; when not located near the intersection, S10 is repeated.

At S20, information on obstacle is acquired from the service center 103 via the vehicle-exterior information transceiver circuit 11 and the wireless communicator 13; the information on obstacle indicates the following: presence or absence of an obstacle; a kind of the obstacle such as an automobile, a motorbike, a bicycle, or a pedestrian; a position of the obstacle; and/or a movement state (direction, velocity) of the obstacle.

At S30, it is determined using the obstacle prediction circuit 7 whether an obstacle exists ahead of the vehicle 101 based on the information acquired at S20. When an obstacle exists, the processing proceeds to S40. When no obstacle exists, the present process ends.

At S40, it is determined affirmatively or negatively the possibility of an obstruction (i.e., collision or incident) due to the obstacle the presence of which is determined affirmatively at S20 and S30, using the obstacle prediction circuit 7. To be specific, a near-future position of the obstacle is estimated from a time-basis variation of the position of the obstacle, and the time-basis variation of the position of the vehicle 101; the near-future position of the obstacle is a relative position of the obstacle with respect to the vehicle 101 from the present time to several seconds later. When the near-future position of the obstacle is close to the vehicle 101, the possibility of the obstruction is affirmatively determined. When the near-future position of the obstacle is sufficiently away from the vehicle 101, the possibility of the obstruction is negatively determined. When the possibility of the obstruction is affirmatively determined, the processing proceeds to S50. When the possibility of the obstruction is negatively determined, the present process ends.

At S50, a displayed position of a cursor (as an example of a picture) is calculated using the virtual image output circuit 17. The cursor may be displayed to appear, from the viewpoint 109 of the driver 107, at a position adjacent to the obstacle, whose possibility of the obstruction is determined at S40, or to overlap, from the viewpoint 109 of the driver 107, partly or entirely with the obstacle. In other words, the cursor may be displayed to permit the driver 107 to see the cursor, which seems to be adjacent to the obstacle or seems to have an overlap partly or entirely with the obstacle.

At S60, an auxiliary display is performed; this will be explained later. At S70, the cursor is displayed at the position calculated at S50.

Figure 3:
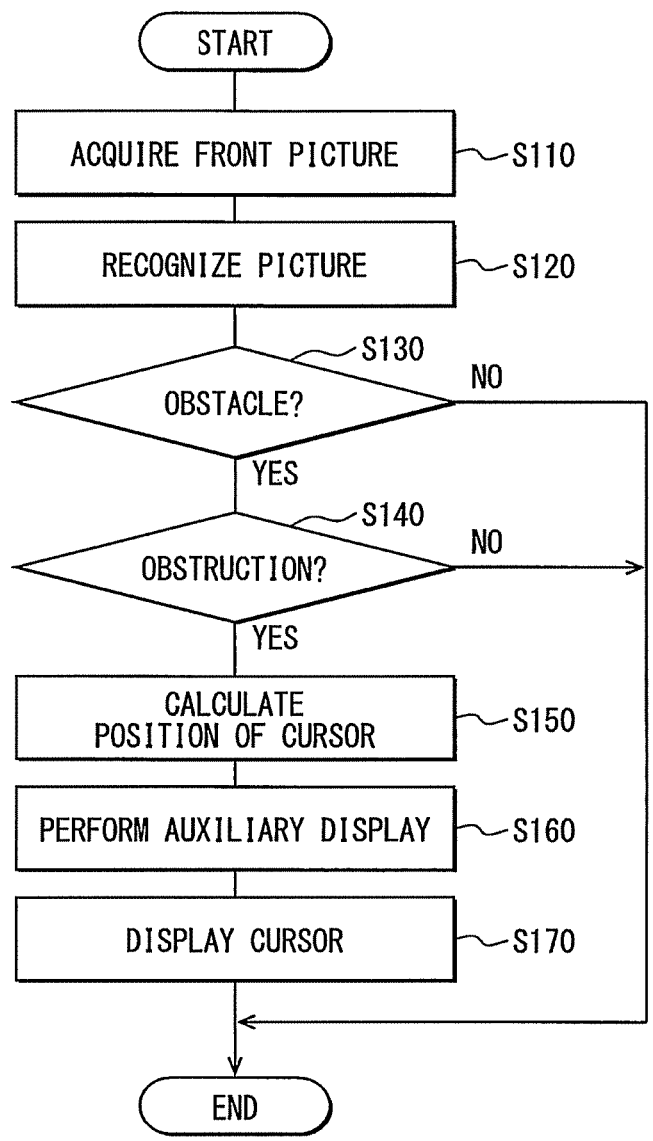
FIG. 3 is a flowchart diagram illustrating a second display process of an obstacle executed by the display apparatus.

(2-2) The following will explain a flowchart of a second display process of an obstacle (also referred to as a second obstacle display process) performed by the display apparatus 1 with reference to FIG. 3. The present process is repeatedly performed with a predetermined time interval during the travel of the vehicle 101.

At S110, a picture or captured image of a forward area ahead of the vehicle 101 is acquired using the front camera 3. At S120, a well-known image recognition process is executed to the picture acquired at S110, to recognize a three-dimensional image, which exists on a surface of a road or a walkway, as an obstacle. The information on a position and magnitude of the obstacle is also acquired at this time. In addition, the shape and the color of the road ahead of the vehicle 101 are also recognized.

At S130, it is determined whether an obstacle is recognized at S120. When an obstacle is recognized, the processing proceeds to S140. When it is not recognized, the present process ends. At S140, it is determined affirmatively or negatively the possibility of an obstruction or incident due to the obstacle the presence of which is determined affirmatively at S110 to S130, using the obstacle prediction circuit 7. To be specific, a near-future position of the obstacle is estimated from a time-basis variation of the position of the obstacle, and the time-basis variation of the position of the vehicle 101; the near-future position of the obstacle is a relative position of the obstacle with respect to the vehicle 101 from the present time to several seconds later. When the near-future position of the obstacle is close to the vehicle 101, the possibility of the obstruction is affirmatively determined. When the near-future position of the obstacle is sufficiently away from the vehicle 101, the possibility of the obstruction is negatively determined. When the possibility of the obstruction is affirmatively determined, the processing proceeds to S150. When the possibility of the obstruction is negatively determined, the present process ends.

At S150, a displayed position of a cursor (as an example of a picture) is calculated using the virtual image output circuit 17. The cursor may be displayed, from the viewpoint 109 of the driver 107, to appear at a position near the obstacle, whose possibility of the obstruction is determined at S140, or to overlap partly or entirely with the obstacle.

At S160, an auxiliary display is performed; this will be explained later. The details are explained later. At S170, the cursor is displayed at the position calculated at S150.

Figure 4:
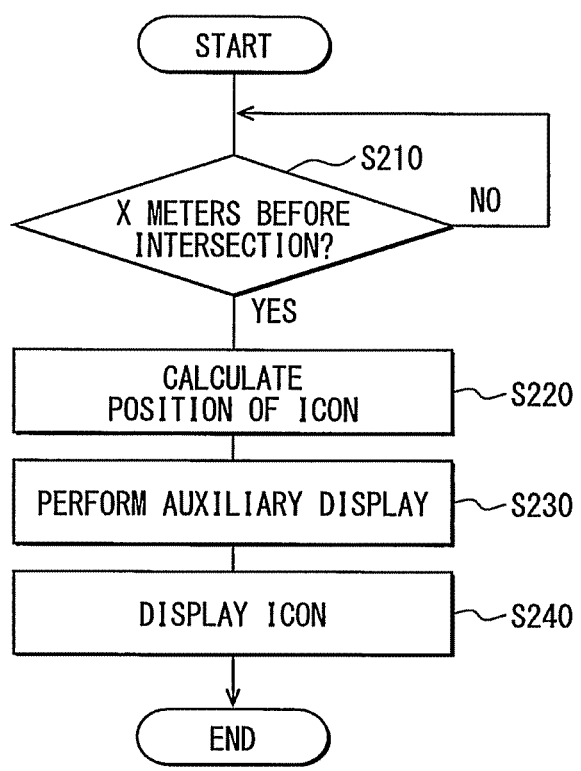
FIG. 4 is a flowchart diagram illustrating a display process of an intersection executed by the display apparatus.

(2-3) The following will explain a flowchart of a display process of an intersection (also referred to as an intersection display process) performed by the display apparatus 1 with reference to FIG. 4. The present process is repeatedly performed with a predetermined time interval during the travel of the vehicle 101.

At S210, it is determined using the navigation system 15 whether the position of the vehicle 101 is less than X meters short of (i.e., before) a guidance intersection, which is defined as an intersection at which the vehicle 101 is going to perform a right/left turn. When the position of the vehicle 101 is determined to be less than X meters short of the guidance intersection, the processing proceeds to S220. When it is not determined, S210 is executed again.

At S220, a displayed position of an icon (as an example of a picture) is calculated using the virtual image output circuit 17. The icon may be displayed to appear, from the viewpoint 109 of the driver 107, at a position near the guidance intersection or to overlap, from the viewpoint of the driver 107, partly or entirely with the guidance intersection. In other words, the icon may be displayed to permit the driver 107 to see the icon, which seems to be adjacent to the guidance intersection or seems to have an overlap partly or entirely with the guidance intersection.

At S230, an auxiliary display is performed; this will be explained later. At S240, the icon is displayed at the position calculated at S220.

(2-4) Auxiliary Display

The auxiliary display is performed in each of the first display process of an obstacle, the second display process of an obstacle, and the display process of an intersection. Such auxiliary display includes a first auxiliary display illustrated in FIGS. 5A to 5D, a second auxiliary display illustrated in FIGS. 6A to 6B, a third auxiliary display illustrated in FIGS. 7A to 7D, a fourth auxiliary display illustrated in FIGS. 8A to 8C, or a fifth auxiliary display illustrated in FIG. 9. Each of the first display process of an obstacle, the second display process of an obstacle, and the display process of an intersection can perform any one of the above first to fifth auxiliary displays.

Furthermore, which one of the five auxiliary displays is performed in each process may be selected by the driver as needed or predetermined. In the case of predetermining, the display apparatus 1 can select one of the five auxiliary displays depending on a kind of the obstacle or a kind of guidance intersection, for example.

The following explains a first auxiliary display. FIGS. 5A to 5D illustrate respective scenery images ahead of the vehicle 101; the scenery images are viewed from the viewpoint 109 of the driver 107. In FIGS. 5A to 5D, a portion above an instrument panel 22 is an area of the windshield 105; the area of windshield 105 is a displayed area 23 on which the HUD 19 can display a virtual image 111.

Figure 5A:
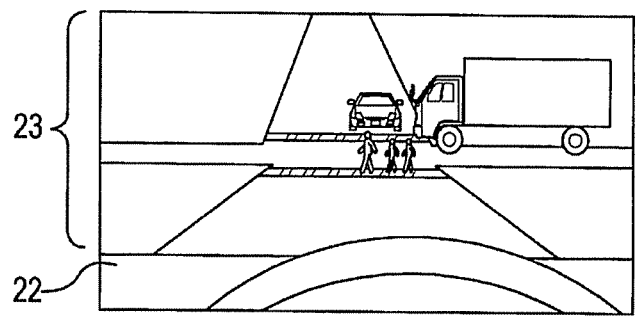
FIGS. 5A to 5D are diagrams illustrating a first auxiliary display.
Figure 5B:
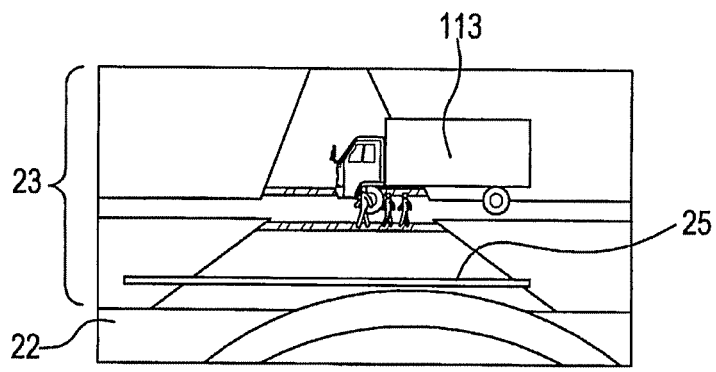

FIG. 5A illustrates a display state before displaying an auxiliary display. FIG. 5B illustrates a first display state of an auxiliary display; FIG. 5B illustrates a picture 25 including at least one line segment, which appears to horizontally extend below a truck (obstacle) 113 and be within a lower half of the displayed area 23. The picture 25 is a picture displayed by the HUD 19. The color of the picture 25 is designated depending on the color of a road serving as a background. The color of the picture 25 is designated as being different from the color of the road recognized by the front measuring circuit 5 to permit easy distinction from the road.

Figure 5C:
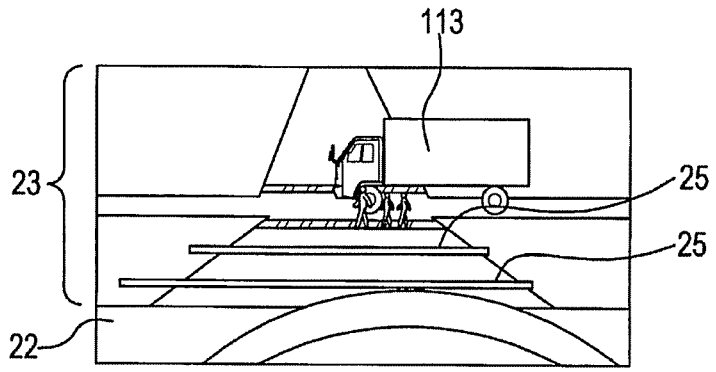
Figure 5D:
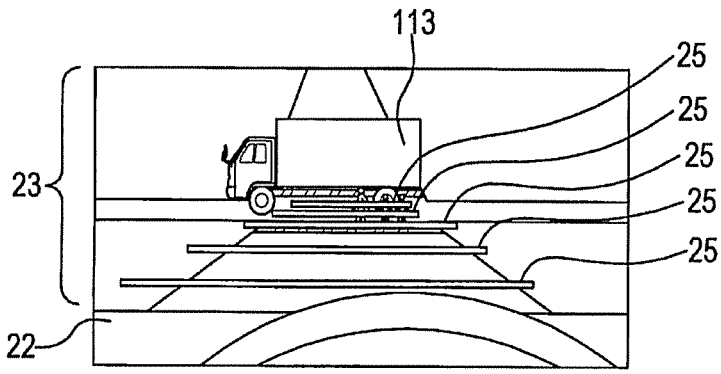

With reference to FIG. 5C and FIG. 5D, with a passage of time, the picture 25 is moved upward while the width of the line segment is shortened, to reach a position just below the truck 113. Such movement path of the picture 25 seems to be along the road where the vehicle 101 is traveling ahead. The movement speed of the picture 25 becomes small as the picture 25 moves upward.

In addition, the movement speed of the picture 25 changes depending on the vehicle speed of the vehicle 101 (for example, the movement speed of the picture 25 becomes high as the vehicle speed becomes high). When the picture 25 appears to reach directly below the truck 113 and completes the movement, the brightness of the picture 25 becomes higher than before. The picture 25 having completed the movement corresponds to the cursor or icon displayed at S70, S170, or S240.

Figure 6A:
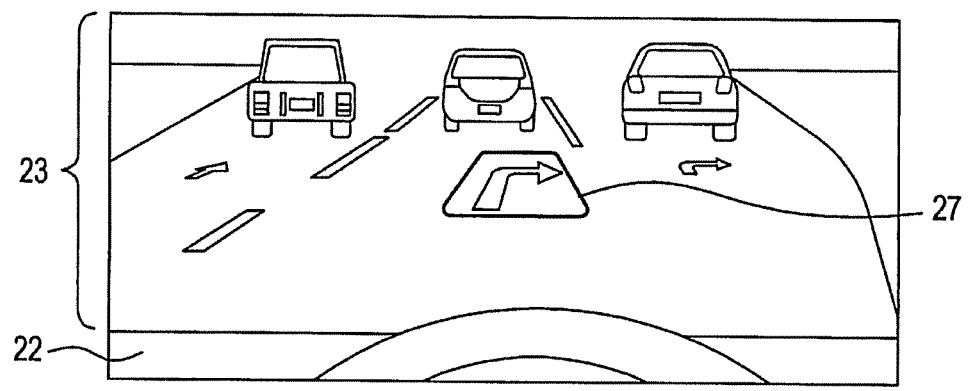
FIGS. 6A to 6B are diagrams illustrating a second auxiliary display.
Figure 6B:
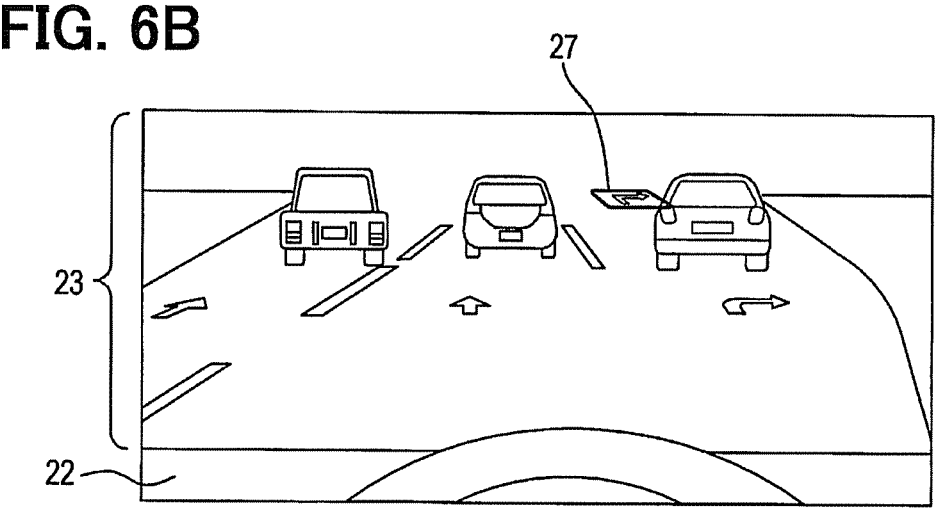

The following explains a second auxiliary display. FIGS. 6A to 6B illustrate respective scenery images ahead of the vehicle 101; the scenery images are viewed from the viewpoint 109 of the driver 107. In FIGS. 6A to 6B, a portion above an instrument panel 22 is an area of the windshield 105; the area of windshield 105 is a displayed area 23 on which the HUD 19 can display a virtual image 111.

FIG. 6A illustrates a first display state of an auxiliary display; FIG. 6A illustrates a picture 27 of a rectangular icon that seems to be located below a forward intersection and within a lower half of the displayed area 23. The picture 27 is a picture displayed by the HUD 19. The color of the picture 27 is designated depending on the color of a road serving as a background. The color of the picture 27 is designated as being different from the color of the road recognized by the front measuring circuit 5 to permit easy distinction from the road.

With reference to FIG. 6B, the picture 27 moves upward and appears to reach a position just below the intersection. The movement speed of the picture 27 becomes smaller as the picture 27 moves upward or higher. In addition, the movement speed of the picture 27 changes depending on the vehicle speed of the vehicle 101 (for example, the movement speed of the picture 27 becomes high as the vehicle speed becomes high). The movement path of the picture 27 appears to go along the road where the vehicle 101 is traveling ahead.

As the picture 27 moves, the longitudinal length and lateral length of the picture 27 become small gradually. However, the lower limit of the magnitude or size of the picture 27 is predetermined; this prevents the magnitude of the picture 27 from becoming smaller than that lower limit. When reaching the lower limit, the magnitude of the picture 27 is maintained unchanged even if the picture 27 moves up farther.

In addition, as the picture 27 moves, the degree of the change or deformation in the magnitude increases gradually. Such deformation seems to be a deformation of an object of a rectangular plate shape on the road; the deformation seems to take place when the object moves from a position close to the vehicle 101 to a position distant from the vehicle 101 without changing the orientation. When the picture 27 appears to reach directly below the intersection and completes the movement, the brightness of the picture 27 becomes higher than before. The picture 27 having completed the movement corresponds to the cursor or icon displayed at S70, S170, or S240.

The following explains a third auxiliary display. FIGS. 7A to 7D illustrate respective scenery images ahead of the vehicle 101; the scenery images are viewed from the viewpoint 109 of the driver 107. In FIGS. 7A to 7D, a portion above an instrument panel 22 is an area of the windshield 105; the area of windshield 105 is a displayed area 23 on which the HUD 19 can display a virtual image 111.

Figure 7A:
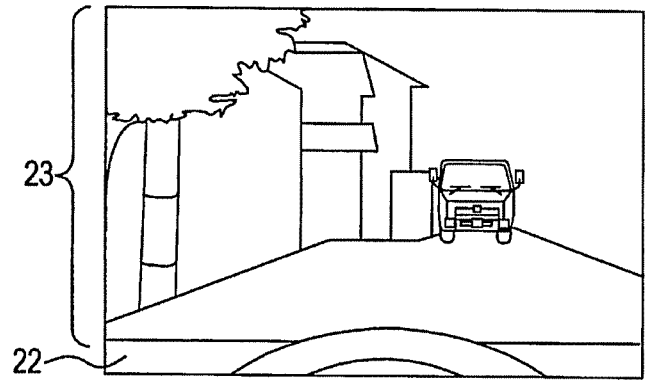
FIGS. 7A to 7D are diagrams illustrating a third auxiliary display.
Figure 7B:
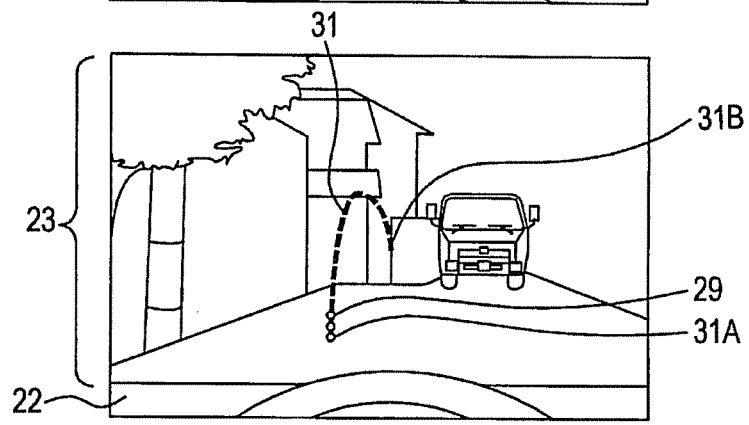

FIG. 7A illustrates a display state before displaying an auxiliary display. FIG. 7B illustrates an early display state of the auxiliary display to display a spherical picture 29 to appear to move along a locus (parabola) 31 that expresses a locus of an object that is assumed to be thrown. The picture 29 is a picture displayed by the HUD 19. In addition, the movement speed of the picture 29 changes depending on the vehicle speed of the vehicle 101 (for example, the movement speed of the picture 29 becomes high as the vehicle speed becomes high).

The start point 31A of the locus 31 is on the vehicle 101 side of the locus 31, and is within the lower half of the displayed area 23. In addition, the end point 31B of the locus 31 seems to be higher than the start point 31A, and is apparently viewed to be farther than the start point 31A. The end point 31B is higher than a position at which an icon 33 and a wave ring picture 35 appears later. The color of the picture 29 is designated depending on the color of a road serving as a background. The color of the picture 29 is designated as being different from the color of the road recognized by the front measuring circuit 5 to permit easy distinction from the road.

Figure 7C:
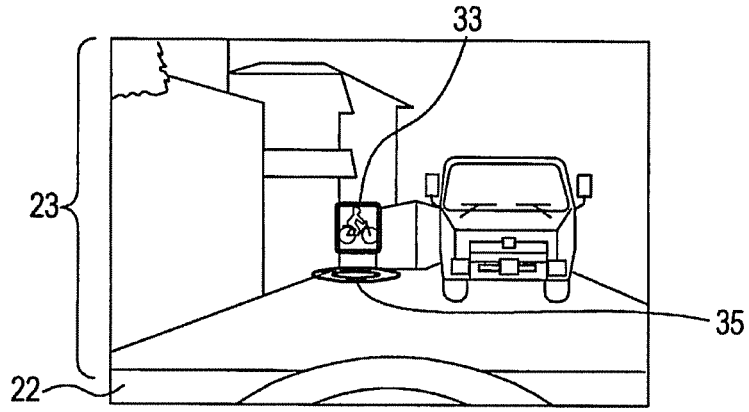

With reference to FIG. 7C, when the picture 29 leaves the start point 31A and reaches the end point 31B, the picture 29 disappears and an icon 33 and a wave ring picture 35 appears. The wave ring picture 35 is small as an obstacle or intersection indicated with the icon 33 is far from the vehicle 101.

The icon 33 is displayed at a position corresponding to an obstacle or intersection; for instance, such position overlaps with the obstacle or adjoins the obstacle. In addition, the icon 33 is at a position on the line extended from the end point 31B of the locus 31. The picture 29 disappears before arriving at the position of the icon 33. The icon 33 corresponds to the cursor or icon displayed at S70, S170, or S240.

The wave ring picture 35 is also at a position on the line extended from the end point 31B of the locus 31, and exceeds the icon 33 to become below the icon 33. The wave ring picture 35 is displayed as if coming into existence when the picture 29 is assumed to be thrown while drawing the locus 31 and fall on a water surface.

Figure 7D:
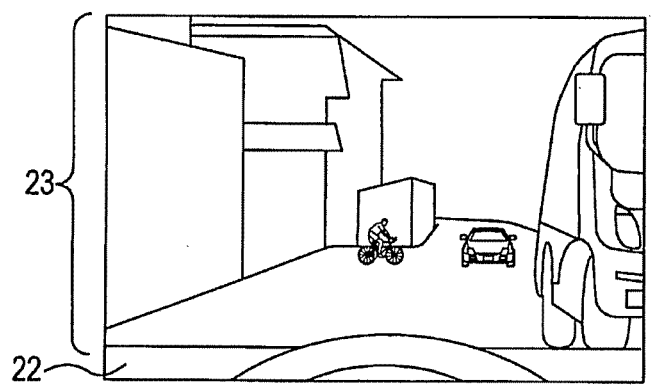

FIG. 7D illustrates a display state where the auxiliary display is completed and the cursor or the icon has disappeared.

Figure 8A:
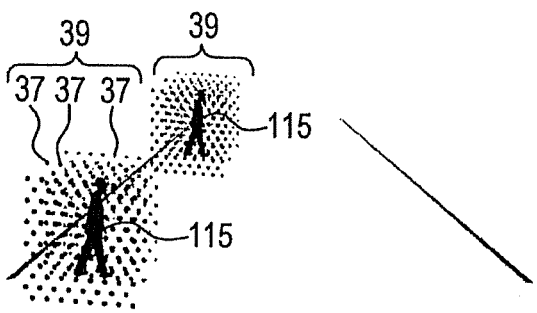
FIGS. 8A to 8C are diagrams illustrating a fourth auxiliary display.
Figure 9:
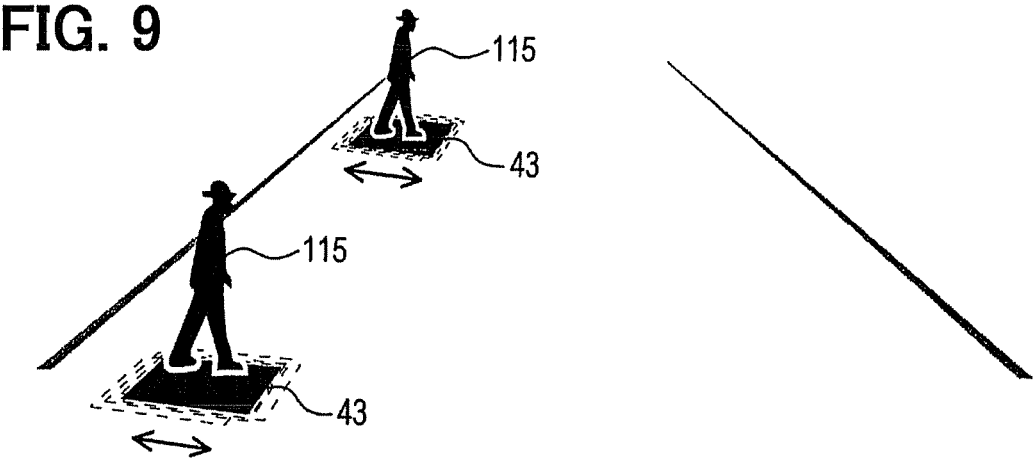
FIG. 9 is a diagram illustrating a fifth auxiliary display.

The following explains a fourth auxiliary display. FIG. 8A illustrates an early display state of an auxiliary display where the HUD 19 displays a misty picture 39 in a displayed area as a virtual image 111. The misty picture 39 includes several picture elements 37 (e.g., pixels) mutually separating from each other. The misty picture 39 represents two-dimensionally (i.e., as a two-dimensional picture) a plurality of objects that are assumed to be in a three-dimensional space; the plurality of objects have the same size and separate from each other with equal separation intervals in three directions that are orthogonal to each other in the three-dimensional space.

The misty picture 39 is displayed in an area including a pedestrian (obstacle) 115. As the distance between the vehicle 101 and the pedestrian 115 included in the misty picture 39 becomes longer, the separation intervals of the picture elements 37 in the misty picture 39 become shorter (the distance between a picture element 37 and an adjoining picture element 37 becomes shorter). As a result, the magnitude of the misty picture 39 is smaller as the distance between the pedestrian 115 and the vehicle 101 is longer.

Figure 8B:
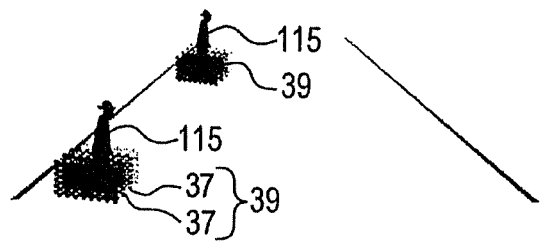
Figure 8C:
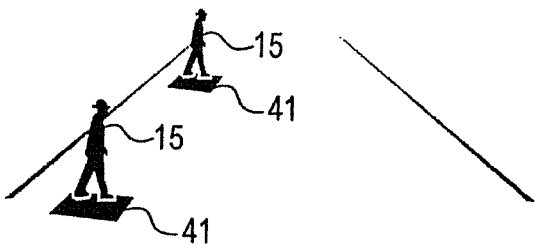

The color of the misty picture 39 is designated depending on the color of a road serving as a background. The color of the misty picture 39 is designated as being different from the color of the road recognized by the front measuring circuit 5 to permit easy distinction from the road. With a passage of time since the start of the auxiliary display, the separation intervals of the picture elements 37 decrease, as indicated in FIG. 8B; then, the picture elements 37 become a single picture 41 (i.e., an integrated picture), as indicated in FIG. 8C. The brightness of the single picture 41 is higher than the brightness of the misty picture 39. The single picture 41 corresponds to the cursor or icon displayed at S70, S170, or S240.

The following explains a fifth auxiliary display to display a picture 43 beneath a pedestrian 115. The picture 43 is a picture displayed by the HUD 19. This picture 43 vibrates in a horizontal direction (repeating horizontally reciprocal movement). As a result, the amplitude of the vibration of the picture 43 is smaller as the distance between the picture 43 and the vehicle 101 is longer. As a result, the magnitude of the picture 43 is smaller as the distance between the picture 43 and the vehicle 101 is longer.

The color of the picture 43 is designated depending on the color of a road serving as a background. The color of the picture 43 is designated as being different from the color of the road recognized by the front measuring circuit 5 to permit easy distinction from the road. Further, the first, third to fifth auxiliary displays are used for indicating an obstacle; they may be used for indicating an intersection. Further, the second auxiliary display is used for indicating an intersection; it may be used for indicating an obstacle.

3. Advantageous Effect of Display Apparatus 1

(3-1) The display apparatus 1 can perform any one of the first to fifth auxiliary displays when displaying an icon or cursor about a target that may be an obstacle or an intersection. Therefore, the driver 107 can acquire a sense of distance to the target.

(3-2) The display apparatus 1 can perform the fourth auxiliary display when displaying an icon or a cursor about a target that may be an obstacle or an intersection. The misty picture 39 in the fourth auxiliary display does not hide the target.

(3-3) In the first and second auxiliary displays, the movement speed of each of the pictures 25 and 27 becomes small as going upward (going far away apparently). Therefore, the driver 107 can acquire better a sense of distance to a target that may be an obstacle or an intersection.

(3-4) In the first and second auxiliary displays, the pictures 25 and 27 move along the road apparently, from the viewpoint 109 of the driver 107. Therefore, the driver 107 can see the pictures 25 and 27 easier and acquire better a sense of distance to a target that may be an obstacle or an intersection.

(3-5) In the first and the second auxiliary displays, the brightness of each of the pictures 25 and 27 becomes higher than before when the pictures 25 and 27 come directly below a target that may be an obstacle or an intersection. Therefore, the driver 107 can recognize a target that may be an obstacle or an intersection more easily.

(3-6) In the first and the second auxiliary displays, the movement speed of each of the pictures 25 and 27 changes depending on the vehicle speed of the vehicle 101. This enables a suitable display according to the vehicle speed.

(3-7) In the first to fifth auxiliary displays, the color of each of the pictures 25, 27, 29, 39, and 43 turns into a different color from the color of the road. Therefore, it becomes easier for the driver 107 to recognize the pictures 25, 27, 29, 39, and 43.

(3-8) In the second auxiliary display, the picture 27 becomes small as it moves up, but it does not become smaller than the fixed lower limit. This helps prevent the driver 107 from not recognizing the picture 27.

<Second Embodiment>

Figure 10:
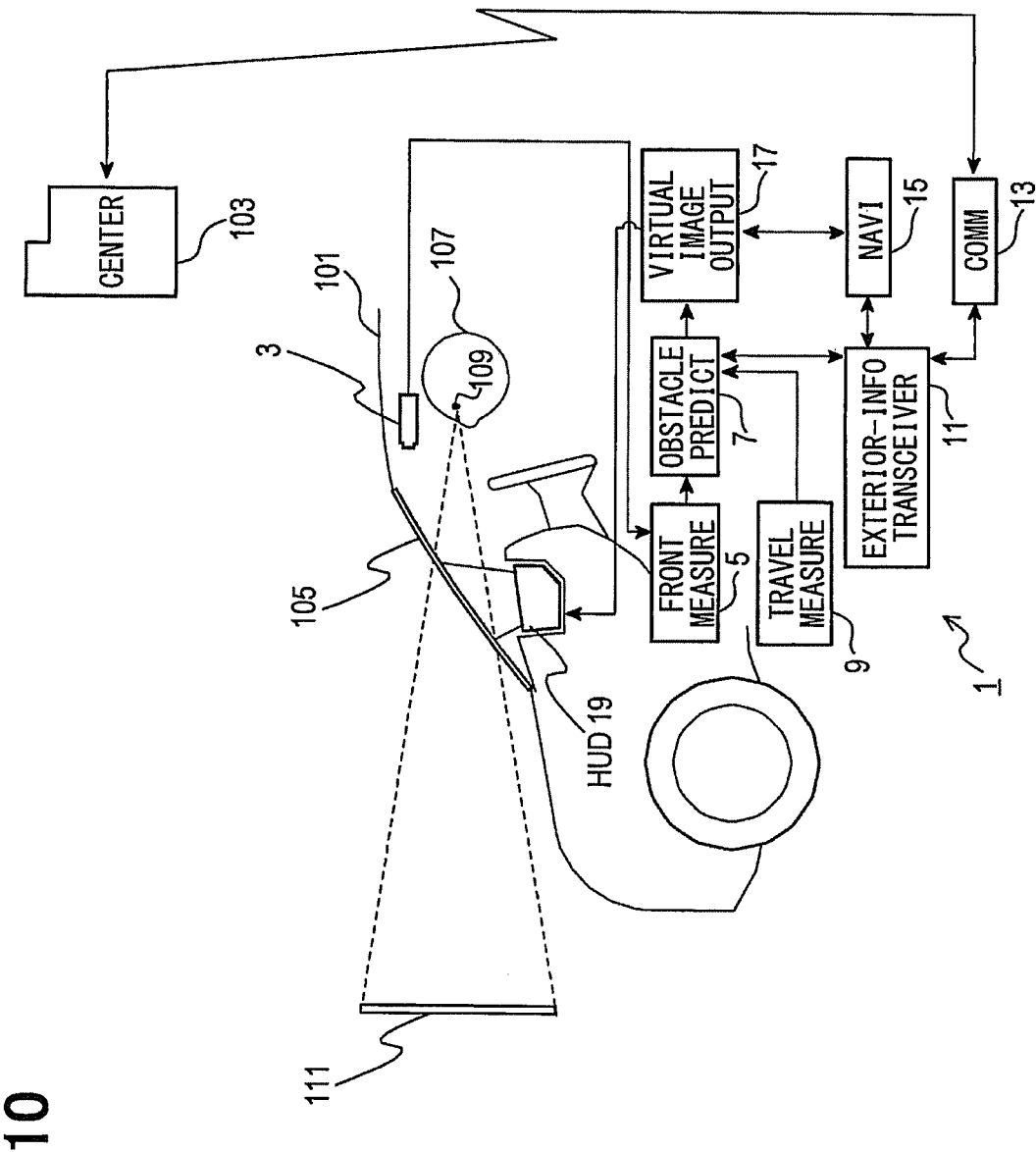
FIG. 10 is a block diagram illustrating a configuration of a display apparatus according to a second embodiment of the present disclosure.

A display apparatus 1 according to a second embodiment of the present disclosure has basically a configuration and an operational effect similar to those of the first embodiment. However, in the present embodiment, as indicated in FIG. 10, the front camera 3 is disposed near the head of a driver 107 in a vehicle compartment of the vehicle 101.

The present disclosure is not limited to the above mentioned embodiment at all. It can be achieved in various manners within a scope not departing from the present disclosure. For example, the HUD 19 may permit a combiner to reflect light which displays a picture.

In addition, the movement speed of each of the pictures 25, 27, and 29 can be designated as needed. For example, the movement speed of each of the pictures 25, 27, and 29 may be constant in any position of the displayed area 23. In addition, the movement speed of each of the pictures 25, 27, and 29 does not need to be dependent on the speed of the vehicle 101, or the distance to a target that may be an obstacle or an intersection.

In addition, the movement path of the pictures 25 and 27 may be designated as needed; for example, it may be a path that does not meet the road where the vehicle 101 is heading. In addition, the brightness of the pictures 25, 27, 29, 39, and 43 can be designated as needed; for example, the brightness may be always constant.

In addition, the color of each of the pictures 25, 27, 29, 39, and 43 may be a color which can be designated as needed; for example, the color may be designated regardless of the color of the road. In addition, the magnitude and shape of each of the pictures 25, 27, 29, 39, 41, and 43 can be designated as needed.

In addition, the first obstacle display process, the second obstacle display process, and the intersection display process may display only auxiliary display without displaying an icon or cursor. In addition, the locus 31 may be a straight line or a curve other than a parabola. In addition, the vibration direction of the picture 43 may not be limited to be horizontal, but be perpendicular or oblique. In addition, the driver camera 21 may be permitted to acquire a facial picture (driver picture) including a viewpoint 109 of the driver 107. The position of the viewpoint 109 may be detected based on the driver picture. The displayed position of each of the pictures 25, 27, 29, 39, 41, and 43 can be changed depending on the position of the viewpoint 109.

In addition, to display the pictures 25, 27, 29, 39, and 41 to be superimposed, the travel state measuring circuit 9 may be provided to detect a behavior of the vehicle 101 such as an acceleration/deceleration of the vehicle 101, the vibration in longitudinal/lateral direction, or the change of the heading direction; thereby, the displayed position of each of the pictures 25, 27, 29, 39, 41, and 43 can be determined in consideration of such behavior of the vehicle 101.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A display apparatus for a vehicle, comprising:
a virtual image display device configured to emit predetermined light to permit a windshield or a combiner to reflect the predetermined light towards an eye of a driver, the emitted predetermined light being to display a picture, the virtual image display device displaying the picture in a displayed area as a virtual image, the picture appearing ahead of the vehicle;

a detection device configured to detect a target that is an obstacle or an intersection;

a picture control device configured
- to display the picture to appear below the target in the displayed area, and
- to then move the picture to a position corresponding to the target apparently while decreasing at least a width of the picture; and a vehicle speed detection device configured to detect a vehicle speed of the vehicle, the picture control device being further configured to cause a movement speed of the picture to become high as the vehicle speed becomes high.

2. The display apparatus according to claim 1, wherein:
the picture is a line segment extended horizontally; and
the picture control device decreases a length of the line segment when moving the line segment.

3. The display apparatus according to claim 1, wherein:
the picture is approximately rectangular; and
the picture control device performs deformation of the picture to permit a degree of the deformation to increase as the picture is moved.

4. The display apparatus according to claim 1, wherein a movement speed of the picture becomes smaller as the picture moves higher in the displayed area.

5. The display apparatus according to claim 1, further comprising:

a road recognition device configured to recognize a road where the vehicle heads, wherein the picture control device moves the picture to permit the eye of the driver to see the picture moving along the road.

6. The display apparatus according to claim 1, wherein
the picture control device raises a brightness of the picture when the picture comes to the position corresponding to the target apparently.

7. The display apparatus according to claim 1, further comprising:

a road surface color detection device configured to detect a color of a road surface ahead of the vehicle, wherein the picture control device changes a color of the picture depending on the color of the road surface ahead of the vehicle.

8. The display apparatus according to claim 1, further comprising a driver picture acquisition device configured to acquire a driver picture including a viewpoint of the driver; and a viewpoint detection device configured to detect a position of the viewpoint based on the driver picture, wherein the picture control device changes a display position of the picture depending on the position of the viewpoint detected by the viewpoint detection device.

9. The display apparatus according to claim 1, wherein
as the picture is moved closer to the target, a magnitude of the picture is caused by the picture control device to become smaller as far as the magnitude of the picture is prevented from becoming smaller than a predetermined lower limit value.

* * * * *